United States Patent Office 3,322,470
Patented May 30, 1967

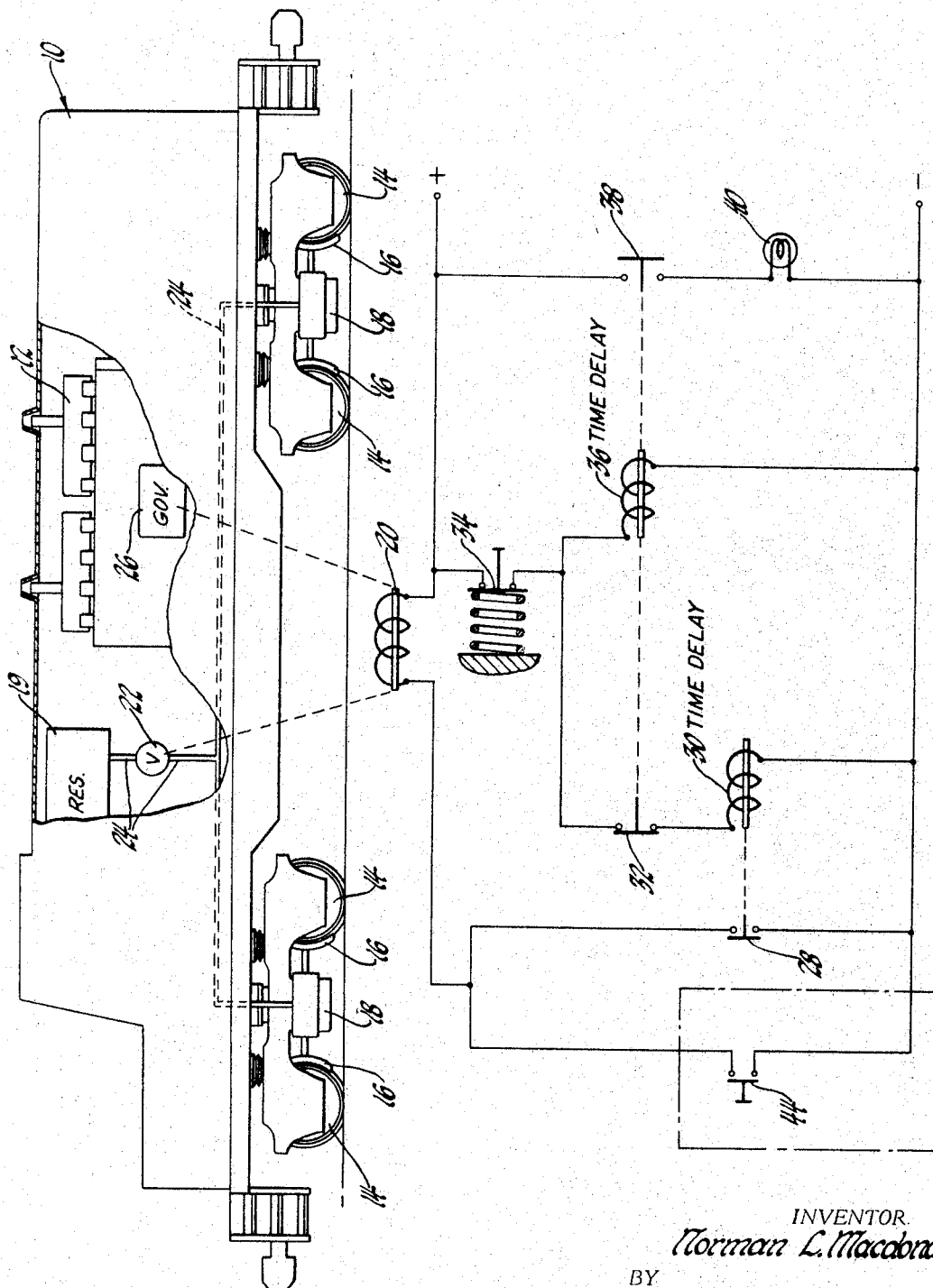

3,322,470
ATTENTIVENESS CONTROL
Norman L. Macdonald, Chicago, Ill., assignor to General Motors Corporation, Detroit, Mich., a corporation of Delaware
Filed June 24, 1964, Ser. No. 377,712
3 Claims. (Cl. 303—19)

This invention relates to an attentiveness control which, if not acted upon within predetermined intervals by an operator to establish active presence, will shut down or otherwise affect equipment controlled thereby for safety or other reasons. This control is particularly suitable for use in a locomotive to require the operator thereof to periodically physically operate a device such as a button or pedal to avoid shutting down the engine and applying the brakes.

A special feature of the control forming the subject of this invention is that it may not be blocked out to circumvent its safety or other intended function.

A further feature is that the control is readily adaptable for use with already existing means provided on a locomotive for shutting down the engine and applying the brakes.

The invention is also an improvement over controls shown in the prior art because of its simplicity in the use of well-known electrical circuit elements.

The details as well as other objects and advantages of a preferred form of this invention are described in the remaining portion of the specification and shown in the drawing which is a schematic representation of a locomotive having the control superimposed thereon.

Referring to the drawing, a locomotive 10 includes an engine 12 adapted to drive wheels 14. It also includes brake shoes 16 adapted to engage wheels 14 upon the application of high pressure compressed air to brake cylinders 18 from a reservoir 19.

The control includes an electrical circuit which is adapted to energize a solenoid 20. Energization of solenoid 20 opens a valve 22 to apply compressed air through a conduit 24 to brake cylinders 18. Energization of solenoid 20 also causes the engine governor 26 to reduce the speed of engine 12 to idle.

Solenoid 20 is energized by having the winding thereof connected across a suitable voltage source, indicated as +—, through closure of an interlock 28 of a time-delay relay 30. It will be noted that the energizing winding of relay 30 is connected in series with a switch 34 and an interlock 32 of a time-delay relay 36 across voltage source +—. Thus, relay 30 may be de-energized either by opening interlock 32 or depressing spring loaded push button switch 34. After a predetermined interval of energization of time-delay relay 36, its interlock 32 opens and a second interlock 38 closes. Closure of interlock 38 energizes a signal 40 by connecting it across voltage source +—.

The operation of the control for the particular application presented is as follows:

When switch 34 is in its normally closed position, relay 36 is energized, but because of its delaying action on pick-up, its interlocks 38 and 32 remain open and closed respectively for a predetermined interval of time. Following this interval, interlock 38 closes and signal 40, which may be an audible or a visible warming or both, is actuated. At the same time, interlock 32 opens, thereby de-energizing relay 30. Relay 30, however, because of its delaying action on de-energization, maintains its interlock 28 open for a predetermined interval. Now, unless the operator opens switch 34 within this latter predetermined interval after receiving the signal from 40, interlock 28 will close causing solenoid 20 to apply the brakes and show the engine.

If, however, as he is expected to do if properly attentive, the operator depresses push button switch 34 within the interval of delaying action of relay 30, relay 36 will be de-energized to immediately reclose its interlock 32, so that when the operator releases push button switch 34, relay 30 will be re-energized to maintain its interlock 28 open and solenoid 20 de-energized.

It will be noted that the operator need not wait for signal 40 to be actuated before pressing switch 34 but may instead periodically press switch 34 to indicate his attentiveness. Each time switch 34 is pressed, the period in which relay 36 will open its interlock 32 begins again.

From the foregoing it will be appreciated that this control may not be blocked in a position to circumvent its function. If switch 34 is held open, relay 30 is de-energized, and after the interval of its delayed action, its interlock 28 will close. If switch 34 is not opened periodically to de-energize relay 36, its interlock 32 will open after the interval of delayed action and de-energize relay 30 to close interlock 28. The only way the operator may prevent eventual closure of interlock 28 and energization of solenoid 20 is either by remaining attentive to the signal 40 and periodically opening switch 34 within the time interval provided by the delaying action of relay 30 or by periodically opening switch 34 within the time interval provided by the delaying action of relay 36.

A normally open switch 44 may be included as an auxiliary element to provide more direct control for applying the brakes and reducing the engine speed to idle.

I claim:

1. An electrical control for use with operating equipment requiring the presence of attentive operating personnel, said control requiring periodic physical action thereupon to indicate attentiveness of such personnel and adapted in the absence of such action to affect operation of such equipment, said control comprising an electrical circuit connectable across a voltage source and including a first relay of the time-delay type which picks up after an interval following energization and which cuts out immediately following de-energization, signal means, means to actuate said signal means in response to pickup of said relay, a second relay of the time-delay type which cuts out after a predetermined interval following de-energization and which picks up immediately following energization, means to de-energize said second relay in response to pickup of said first relay and to energize said second relay in response to cutout of said first relay, control means adapted to affect operation of the equipment, means to actuate said control means in response to cutout of said second relay, and physically actuated means to energize and de-energize said first relay which must be acted upon by the operating personnel to sequentially de-energize and energize said first relay within said predetermined interval following pickup of said first relay and actuation of said signal means and de-energization of said second relay to energize and prevent cutout of said second relay whereby actuation of said control means is avoided.

2. In a locomotive having brakes operated by the application of pressurized air and having an engine controlled by a governor, a locomotive attentiveness control comprising a voltage source, a first electrical circuit connected thereacross and including a first relay of the time-delay type upon pickup, a second relay of the time-delay type upon cutout connected in parallel with said first relay, said first relay having an interlock adapted to cut out said second relay upon pickup of said first relay, and a switch connected in series with said first and second relays and adapted to open said circuit to prevent pickup of said first relay, a second electrical circuit including a signal connected in parallel with said first circuit across said voltage source, said first relay having an interlock adapted upon pickup thereof to close said second circuit to operate said signal, a third electrical circuit including electrically operated means connected in parallel with said first and second circuits across said voltage source, said electrically operated means being adapted upon pickup to apply pressurized air to operate the brakes and to cause the governor to reduce the speed of the engine, said second relay having an interlock adapted upon cutout thereof to close said third circuit to cause pickup of said electrically operated means.

3. The control of claim 2 wherein said third circuit further includes means connected in parallel with said interlock of said second relay and connected in series with said electrically operated means whereby pickup of said electrically operated means may be caused independently of said second relay.

References Cited
FOREIGN PATENTS 1,114,845  10/1961  Germany.

EUGENE G. BOTZ, *Primary Examiner.*